United States Patent Office 3,062,801
Patented Nov. 6, 1962

3,062,801
PROPYLENE CATALYST
Donald F. Hoeg, Rockville, and Calvin J. Benning, Clarksville, Md., assignors to W. R. Grace & Co., Clarksville, Md., a corporation of Connecticut
No Drawing. Filed June 1, 1960, Ser. No. 33,346
9 Claims. (Cl. 260—93.7)

This invention relates a method of increasing the molecular weight of polypropylene by the use of an improved preformed highly activated catalyst.

It is known to polymerize propylene in the presence of a catalyst prepared from a combination of metals of groups IVB to VIB of the periodic system by reaction with an organic combination of metals of groups II and III. See Belgian Patent 543,259, issued November 30, 1955, to Montecatini et al. The crystalline isotactic polypropylene obtained by such known methods has an intrinsic viscosity in the range 1.86 to 2.39. Although no data is presently available for polypropylene which relate intrinsic viscosity to molecular weight it is known that the higher the intrinsic viscosity of a polymer, the greater the molecular weight. Since it is well known that the inrinsic viscosiy of popylene polymer varies inversely with the reaction temperature, the reaction temperatures in the examples in the aforementioned Belgian patent were maintained in a range whereat a relatively high intrinsic viscosity was obtained for the polymer. However, in this temperature range, i.e. 70–90° C. the polyproplyene on formation precipitates out of solution, thereby necessitating a subsequent reheating step to solubilize the polymer in order to filter it free of solid metallic catalyst residue which causes discoloration. Such temperature changes cause degradation of the polymer properties are to be avoided.

Therefore, an object of the present invention is to form a propylene polymer having a relatively high intrinsic viscosity and molecular weight at a temperature whereat the polymer remains in solution and can be filtered free of solid metallic catalyst residues.

Surprisingly, we have now found a method of increasing the intrinsic viscosity and molecular weight of propylene polymers even at higher temperatures, e.g. 120–180° C. whereat polypropylene remains in solution, by subjecting propylene to the action of a catalyst, a component of which has been prepared by ball-milling in a gaseous atmosphere of propylene.

In summary, this invention is directed to synthesizing propylene polymers of very high molecular weight by subjecting propylene under pressure to the action of a catalyst consisting essentially of triisobutyl aluminum and a member of the titanium halide group consisting of $TiCl_2$ and $TiCl_3$ with propylene adsorbed thereon, said group prepared by grinding the group member in a gaseous atmosphere consisting essentially of propylene.

The essence of this invention is the adsorption of proplyene on the surface of the titanium halide catalyst component in a grinding operation. The thus treated component when used in conjunction with aluminum triisobutyl forms a catalyst for the polymerization of propylene which results in polypropylene having a higher molecular weight shown as a function of intrinsic viscosity than polypropylene formed under the same polymerization reaction conditions excepting that the catalyst was not ground or was ground in merely an inert atmosphere.

Therefore, another object of the instant invention is to produce a catalyst for propylene polymerization which will form polypropylene having a higher molecular weight compared to that disclosed in Belgian Patent 543,259 at any specific polymerization temperature.

The reason for the increase in molecular weight of polypropylene due to grinding of the titanium halide component of the catalyst in the presence of the monomer to be polymerized is not fully known. Since it is known that molecular weight of polypropylene varies inversely with the polymerization temperature, it would seem that polymerization reactions performed at relatively high temperatures., e.g. 120–160° C., in accordance with the instant invention would yield polypropylene having a molecular weight lower than that obtained by polymerizing at the usual temperatures, i.e. 70–80° C. Such is not the case when the titanium halide component is ground in an atmosphere of a gaseous propylene monomer to be polymerized. As it is not known at present whether the polymerization reaction is initiated by an ionic, free radical, or a combination of such mechanisms, it is not certain whether the grinding of the titanium halide component of the catalyst in the gaseous monomer is causing an increase in the polymerization rate or causing a decrease in the rate of termination of the polymerization reaction. In any event, we do not wish to be bound by any theory. Suffice it to say that when the titanium halide component of the catalyst is ground in the presence of gaseous propylene monomer the thus pretreated catalyst component in combination with triisobutyl aluminum yields a highly activated catalyst for polypropylene having a high molecular weight.

To insure the enchanced catalytic activity of the titanium halide pre-treated in conformance with this invention it is necessary that the activated catalyst be maintained free from contact with contaminants, which tend to deactivate the catalyst thereby decreasing or terminating its propylene polymerization power. Such contaminants include oxygen, moisture, carbon dioxide, and the like. To preserve freedom from contaminants, the activated titanium halide catalyst with propylene adsorbed thereon is transferred from the ball-mill in a "dry box" maintained under a slight pressure of a gas inert to the activated catalyst. In the experiments and examples stated herein, argon is used as the inert gas in the "dry box." However, pure lamp grade nitrogen and the other noble gases, especially helium and neon, are equally suitable. The transference of the activated catalyst component in the "dry box" can be made either to an argon-purged storage vessel for later polymerization use or directly into an argon-purged polymerization reactor. In addition, the pre-treated titanium halide can be premixed with triisobutyl aluminum prior to charging to the polymerization reactor.

Although a ball mill was used in all examples in the specification, substantially any mechanism can be used for the grinding operation that can be maintained under pressure, free of catalyst contaminants and which causes the individual pieces of titanium halide to break up into smaller particles and/or causes their surfaces to be cleaned or abraded. Other operable mechanisms would include a rod mill, pebble mill, jet (or colloid) mill, vibrating ball mill and the like.

The duration of the grinding step is dependent upon the efficiency of the grinding mechanism employed. In runs using a ball mill and the preferred propylene pressure range, infra, the grinding should be carried on for at least 1 hour and preferably for several days, e.g. two to ten. However, more efficient grinding mechanisms, e.g. a vibrating ball mill would allow grinding time to be decreased substantially.

Grinding the titanium halide component of the catalyst in the presence of propylene is preferably, but not necessarily, performed at super atmospheric pressure, e.g. up to 125 p.s.i. A preferred range of propylene monomer pressure used in the grinding step is a superatmospheric pressure up to 50 p.s.i.

The titanium halide catalyst so prepared when used in combination with triisobutyl aluminum is useful in making high molecular weight solid propylene. It is operable at polymerization temperatures ranging from 50–200° C. preferably 120–180° C.

Also, when using the catalyst of this invention, pressures in the polymerization reactor are suitably in the range of 30–1000 p.s.i., and even higher. Preferably, pressure is in the range of 100–600 p.s.i. and for practical purposes pressures in the range of 100–250 p.s.i. are adequate. The polymerization reaction is generally performed in the presence of a liquid hydrocarbon reaction medium. The liquid hydrocarbon reaction medium should be inert to the reaction, remain liquid under the polymerization conditions of temperature and pressure employed, and free of contaminants, which retard or inhibit the polymerization reaction per se or have an adverse effect on the catalyst activity. Such contaminants include moisture, oxygen, carbon dioxide, any active hydrogen-containing material and the like. A liquid hydrocarbon reaction medium in which the propylene monomer would dissolve is preferred. Such liquid hydrogen reaction mediums are well known to those skilled in the art, and include pentane, hexane, heptane, cyclohexane, octane, benzene, xylene, toluene, and the like.

The amount of activated catalyst is not critical. Relatively small amounts are adequate to form relatively large amounts of polymer. In general, a practical range is .05–.003 gram of combined catalyst per gram of proylene polymerized. Larger amounts of catalyst are operable but unnecessary. In addition, the ratio of the pre-treated titanium halide cataylst components to the triisobutyl aluminum is not critical. Weight ratios of titanium halide with propylene adsorbed thereon: triisobutyl aluminum of 1:0.2–10 are operative; a preferred range is respectively 1:0.5–3. The crude propylene polymer obtained by the practice of this invention may be purified and recovered by techniques well known in the art. For example, the crude polymer may be washed with isopropanol-HCl-acetylacetone followed by filtration and drying. Another method where the polymerization reaction is performed at a temperature at which the polymer remains in solution would include adding a chelating agent and filtering the soluble polymer free of metallic catalyst residue as disclosed in Canadian Patent 568,722.

Throughout this specification, it will be understood that all samples of catalyst components are weighed and added to the polymerization reactor under conditions equivalent to the conditions of activation as regards freedom from deactivating contaminants. The following examples will aid in illustrating the invention but do not limit its scope.

EXAMPLE 1

$TiCl_3$ Catalyst Activation in Propylene 200 gms. of $TiCl_3$ (minus 100 mesh) were charged to a 590 ml. stainless steel ball mill containing seventy-five ⅜" stainless steel balls and removably connected through two needle valves to a rotatable gas cylinder (75 ml. capacity).

The entire rotatable mechanism was charged initially with 110 p.s.i.g. of propylene, the valves were closed and milling was commenced. After three days of milling, a further charge of 110 p.s.i.g. propylene was released into the rotatable mechanism and milling was continued for two more days. Following the five days' milling, the $TiCl_3$ catalyst showed a gain of 16 gms. of propylene (8% of the total titanium halide catalyst weight). The thus-activated catalyst was transferred to a storage vessel under argon to be used for subsequent propylene polymerization.

EXAMPLE 2

$TiCl_2$ Catalyst Activation in Propylene

Using the apparatus and procedure of Example 1, 185 gms. of $TiCl_2$ were ball-milled under a propylene pressure of 110 p.s.i.g. for a period of 5 days. The thus-activated catalyst showing a weight increase of 7.3% was transferred to a storage vessel under argon to be used for propylene polymerization.

EXAMPLE 3

Propylene Polymerization 0.5 gm. of the $TiCl_3$ prepared in Example 1 was placed in a 1-liter stainless steel polymerization reactor fitted with agitator and containing 300 mls. of dry cyclohexane. After heating to 120° C., 0.64 gm. of triisobutyl aluminum was added to the reactor. Immediately thereafter the reactor was pressured with propylene to 135 p.s.i.g. The reaction was continued with agitation for two hours during which time the temperature was maintained in the range 118°–124° C. Frequent repressurizing with propylene was necessary during the run to maintain the 135 p.s.i.g. in the reactor. The reactor was then cooled and the excess propylene gas vented. Upon opening the reactor a crude solid polypropylene was obtained. The polymer was washed in a Waring Blendor with a solution of isopropanol-HCl (10% by volume) acetylacetone (1% by weight), for 10 minutes. Thereafter the polymer was filtered free of the washed solution and rewashed 3 times with 500 ml. isopropanol. The polymer was then vacuum-dried to constant weight. The yield was 111 gms. propylene polymer.

To obtain the intrinsic viscosity of this polymer as a measure of the molecular weight, 2 gms. of the dried polymer were continuously extracted for 15 hours in a Soxhlet extractor with boiling n-heptane, to separate the isotactic portion of the polymer. The isotactic residue in the extractor thimble (65.5% of the polymer) was vacuum-dried and thereafter subject to intrinsic viscosity measurements in decalin at 135° C. The soluble filtrate portion in the Soxhlet extractor apparatus containing the heptane soluble fraction (34.5% of the polymer) was coagulated and precipitated by adding cold isopropanol to the filtrate solution. The thus-precipitated heptane soluble fraction, after drying, had an intrinsic viscosity in decalin at 135° C. of 0.92. Intrinsic viscosity of the isotactic fraction was 5.09.

EXAMPLE 4

Following the procedure in Example 3, 0.4 gm. $TiCl_2$ as prepared in Example 2, were charged to a 1-ml. stainless steel autoclave equipped with agitator and containing 300 mls. of dry cyclohexane. After heating to 120°, 0.67 gm. triisobutyl aluminum was added to the reactor and the reactor immediately pressured to 135 p.s.i.g. with propylene. After 2 hours, during which time the temperature was maintained in the range of 118–124° C. and the pressure was maintained at 135 p.s.i.g., the run was discontinued and the autoclave cooled and vented. The crude polymer was washed in accordance with the procedure set out in Example 3. The dried polymer weighed 28 gms. The intrinsic viscosity of the isotactic fraction (74% of the polymer) and the heptane soluble fraction obtained by following the procedure set out in Example 3 was 6.89 and 1.14 respectively.

The following example will point out the increase in molecular weight due to pretreating the catalyst in accordance with the instant invention when compared to a catalyst with its titanium halide component ball-milled in an inert atmosphere.

EXAMPLE 5

0.41 g. $TiCl_2$ prepared by ball-milling in a 750 ml. stainless steel ball mill under a slight pressure of argon (2 p.s.i.) for 5 days was charged to a 1-liter stainless steel autoclave equipped with an agitator and containing 300 ml. of dry cyclohexane. After heating to 55° C., 0.69 g. triisobutyl aluminum ($TiCl_2$-triisobutyl aluminum molar ratio of 1:1.1) was added to the autoclave and the autoclave immediately pressured to 135 p.s.i.g. with propylene. Following a reaction period of 1 hour and 40 minutes, during which time the temperature varied in the range 55–67° C. and the pressure in the range 130–140 p.s.i.g., the run was discontinued. The dried solid propylene polymer recovered after washing by the procedure in Example 3 weighed 65 gms. The polymer product was 50% isotactic and the isotactic fraction had an intrinsic viscosity of 2.75 when measured in decalin at 135° C.

EXAMPLE 6

0.5 g. $TiCl_3$ with 0.56% propylene by weight adsorbed thereon, having been ball milled at room temperature under an initial propylene pressure of 40 p.s.i. for 12 hours, was charged to a stainless steel polymerization reactor containing 300 mls. of dry cyclohexane. The reactor was heated to 120° C. and 0.65 g. of triisobutyl aluminum was added thereto. The reactor was pressured to 135 p.s.i.g. and the run was continued for 2 hours. After washing and drying as in Example 1, a good yield of high molecular weight polypropylene was obtained. The isotactic portion of the propylene had an intrinsic viscosity of about 4.5.

EXAMPLE 7

0.48 g. $TiCl_2$ with 0.52% propylene by weight adsorbed thereon, having been ground for 16 hours at room temperature in a gaseous atmosphere supplied by 30 p.s.i. propylene, was charged to a polymerization reactor containing 300 ml. of dry cyclohexane. After heating to 120° C., 0.70 g. triisobutyl aluminum was added thereto and the reactor was pressurized to 135 p.s.i.g. with propylene. Following the washing and drying procedure in Example 1, a fair yield of high molecular weight polypropylene, the isotactic portion of which had an intrinsic viscosity of about 5.3 was obtained.

The ball milling operation in the instant invention to prepare the catalyst is performed at room temperature.

In the catalyst preparation step wherein a member of the titanium halide group consisting of $TiCl_2$ and $TiCl_3$ is ground in a gaseous propylene atmosphere, the amount of gaseous propylene adsorbed on the group member can vary within wide limits. Obviously the greater the surface area/particle of the aforementioned group member, the greater the amount of gaseous propylene capable of being adsorbed thereon. Therefore, the amount of propylene which can be adsorbed will depend on the particle size of the titanium chloride group member which is a function of grinding time and efficiency. Gaseous propylene adsorption on the titanium chloride group member in the range 0.5 to 15% by weight of the titanium chloride group member has been found to be operable. Preferably 0.5 to 10% by weight is employed.

This application is a continuation in part of our application having Serial Number 823,361, filed June 29, 1959, now abandoned.

The uses of the polypropylene of this invention are analogous to those prepared by prior art procedures. The increase in molecular weight of the propylene polymer produced by application of this invention results in propylene polymers which are resistant to low temperature brittleness, have superior tensile strength and stiffness properties.

We claim:
1. The method of forming a catalyst to make high molecular weight polypropylene that comprises grinding as the sole material being ground a member of the group consisting of $TiCl_2$ and $TiCl_3$ in a gaseous propylene atmosphere for at least one hour at an ambient temperature and a propylene pressure ranging from atmospheric to 125 p.s.i. and combining the thus ground product with triisobutyl aluminum.

2. The method according to claim 1 in which the titanium halide-propylene product is combined with triisobutyl aluminum in a weight ratio range of 1:0.2 to 10 respectively.

3. The method of forming high molecular weight polypropylene, that comprises subjecting propylene to the action of a catalyst consisting essentially of triisobutyl aluminum and the product obtained by grinding as the sole material being ground a member of the group consisting of $TiCl_2$ and $TiCl_3$ in a gaseous propylene atmosphere for at least one hour at an ambient temperature and a propylene pressure ranging from atmospheric to 125 p.s.i.

4. The method of claim 3 in which the weight ratio of titanium halide with propylene adsorbed thereon to triisobutyl aluminum is 1:0.2–10.

5. The method according to claim 3 in which the polymerization is performed in an inert liquid hydrocarbon reaction medium.

6. The method according to claim 5 wherein the liquid hydrocarbon reaction medium is cyclohexane.

7. A polymerization process for forming high molecular weight polypropylene which comprises contacting propylene with an activated catalyst, said activated catalyst consisting essentially of triisobutyl aluminum and the product obtained by grinding as the sole material being ground a member of the group consisting of $TiCl_2$ and $TiCl_3$ in a gaseous propylene atmosphere for a period of 1 to 5 days at an ambient temperature and a propylene pressure range from atmospheric to 125 p.s.i.

8. The process according to claim 7 wherein the combined catalyst to propylene polymer weight ratio is in the range 0.05–0.003:1 respectively.

9. The process according to claim 7 wherein the weight ratio of titanium halide with propylene adsorbed thereon to triisobutyl aluminum is 1:0.2–10.

References Cited in the file of this patent

UNITED STATES PATENTS

| 2,914,515 | Stuart | Nov. 24, 1959 |
| 2,956,050 | Benning | Oct. 11, 1960 |

FOREIGN PATENTS

| 777,538 | Great Britain | June 26, 1957 |